United States Patent [19]
Moon et al.

[11] Patent Number: 5,918,070
[45] Date of Patent: Jun. 29, 1999

[54] DMA CONTROLLER WITH CHANNEL TAGGING

[75] Inventors: Kab Ju Moon, Cupertino; Amjad Z. Qureshi, San Jose, both of Calif.

[73] Assignee: Samsung Electronics Co., Ltd., Rep. of Korea

[21] Appl. No.: 08/730,611

[22] Filed: Oct. 18, 1996

[51] Int. Cl.⁶ .................................................. G06F 12/00
[52] U.S. Cl. ...................................... 395/842; 395/182.07
[58] Field of Search ............................ 395/182.07, 182.2, 395/185.06, 842–848; 711/139

[56] References Cited

U.S. PATENT DOCUMENTS 5,586,248  12/1996  Alexander et al. ................... 395/182.2
5,586,253  12/1996  Green et al. ....................... 395/185.06
5,749,093   5/1998  Kobayashi et al. ..................... 711/139

OTHER PUBLICATIONS

PD8257 Programmable DMA Controller, NEC 1987 Microcomputer Products Data Book, vol. 2 of 2, pp. 8–79 through 8–89, (1987).
PD71071 DMA Controller, NEC 1987 Microcomputer Products Data Book, vol. 2 of 2, pp. 7–91 through 7–125, (1987).
"Am29200 Microprocessor Block Diagram", 2 pages, (date unknown).
"82C37A–5 CHMOS High Performance Programmable DMA Controller", Intel, Sep (1988), pp. 3–33–3–50.
"KS0122 Product Brief", Samsung Electronics, Advance Information, pp. 1–8 (date unknown).
"KS0119 Data Sheet", Samsung Semiconductor, pp. 1–50 (Jul., 1995).

"Digital Video Interface Application Notes", pp. 1–19 and 51–54, Samsung Data Sheet (date unknown).
1996 Samsung Databook, "Multi Media IC", Samsung Electronics pp. 47–93 and 134–161, (Nov., 1995).
"Am29200 and Am29205 RISC Microcontrollers User's Manual", Advanced Micro Devices, pp. 11–1 through 11–15, (1994).
"Serial Port 16–Bit SoundComm Codec", Analog Devices Ad1843, pp. 20–25, (1996).
"Am29200 and Am29205 RISC Microcontrollers", Advanced Micro Devices, pp. 1–31, (1994).

*Primary Examiner*—Robert B. Harrell
*Assistant Examiner*—David M. Ovedovitz
*Attorney, Agent, or Firm*—Skjerven, Morrill, MacPherson, Franklin & Friel LLP

[57] ABSTRACT

A DMA controller receives a DMA request from a DMA channel and generates a transaction request ID identifying the requested transaction as well as a codec ID identifying the DMA channel. The codec ID is stored in the DMA controller in association with the transaction request ID. The DMA controller obtains control of the bus and outputs a transaction request onto the bus along with the transaction request ID. The DMA controller then relinquishes control of the bus. A device on the bus returns the transaction request ID when it responds (the transaction request ID is "tagged" to the response). The DMA controller uses the returned transaction request ID to look up the codec ID stored in the DMA controller in association with that transaction request ID. The DMA controller uses the codec ID to associate the response with the correct DMA channel. In the event the split transaction is a posted read, the DMA controller uses the returned transaction request ID to supply the data to the DMA channel that issued the DMA request.

18 Claims, 5 Drawing Sheets

5,918,070

DMA CONTROLLER WITH CHANNEL TAGGING

FIELD OF THE INVENTION

This invention relates to DMA (direct memory access) controller circuits.

BACKGROUND INFORMATION

An operation called a "posted read" can be performed on some digital busses. A posted read is a split bus transaction in the sense that a first device requests data from a second device on the bus in the first part of the transaction (i.e., it "posts" the read). Rather than occupying the bus while the second device retrieves the data and puts the requested data onto the bus, the first device releases the bus. When the second device is ready with the data, the second device obtains control of the bus and supplies the data onto the bus and to the first device in the second part of the transaction.

FIG. 1 illustrates one possible multimedia system involving a processor 1, a memory 2, a bus 3, a DMA (direct memory access) controller 4, a video encoder 5, a video display 6, an audio encoder 7, and a speaker 8. It may be desired to send video data stored in memory 2 to video display 6 and to send audio data stored in memory 2 to speaker 8. A DMA controller is sought which will supply the correct data to the video encoder and the correct data to the audio encoder when posted read operations are used on bus 3 to read the data from memory 2.

SUMMARY

A DMA controller receives a DMA request from a DMA channel and generates a transaction request ID identifying the requested transaction as well as a codec ID identifying the DMA channel. The codec ID is stored in the DMA controller in association with the transaction request ID. The DMA controller obtains control of the bus and outputs a transaction request onto the bus along with the transaction request ID. The DMA controller then relinquishes control of the bus. A device on the bus returns the transaction request ID when it responds (the transaction request ID is "tagged" to the response). The DMA controller uses the returned transaction request ID to look up the codec ID stored in the DMA controller in association with that transaction request ID. The DMA controller uses the codec ID to associate the response with the correct DMA channel. In the event the split transaction is a posted read, the DMA controller uses the returned transaction request ID to supply the data to the DMA channel that issued the DMA request.

In some embodiments, multiple pairs of transaction request IDs and codec IDs are stored in the DMA controller at the same time such that multiple uncompleted transactions can be posted on the bus at the same time. DMA requests may be received in one order but the associated transactions may be completed in a different order.

This summary does not purport to define the invention. The invention is defined by the claims.

DETAILED DESCRIPTION OF THE PREFERRED EMBODIMENTS

Figure 1:
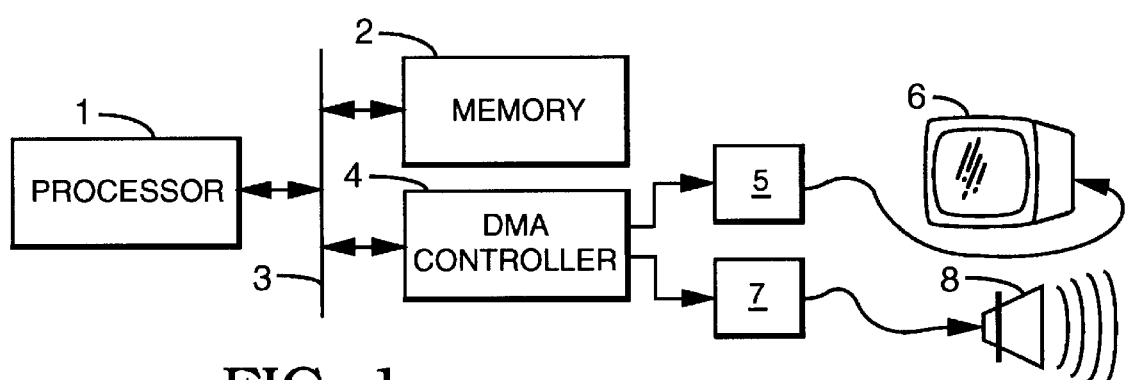
FIG. 1 illustrates one possible multimedia system wherein a DMA controller is sought which supports posted read transactions.
Figure 2:
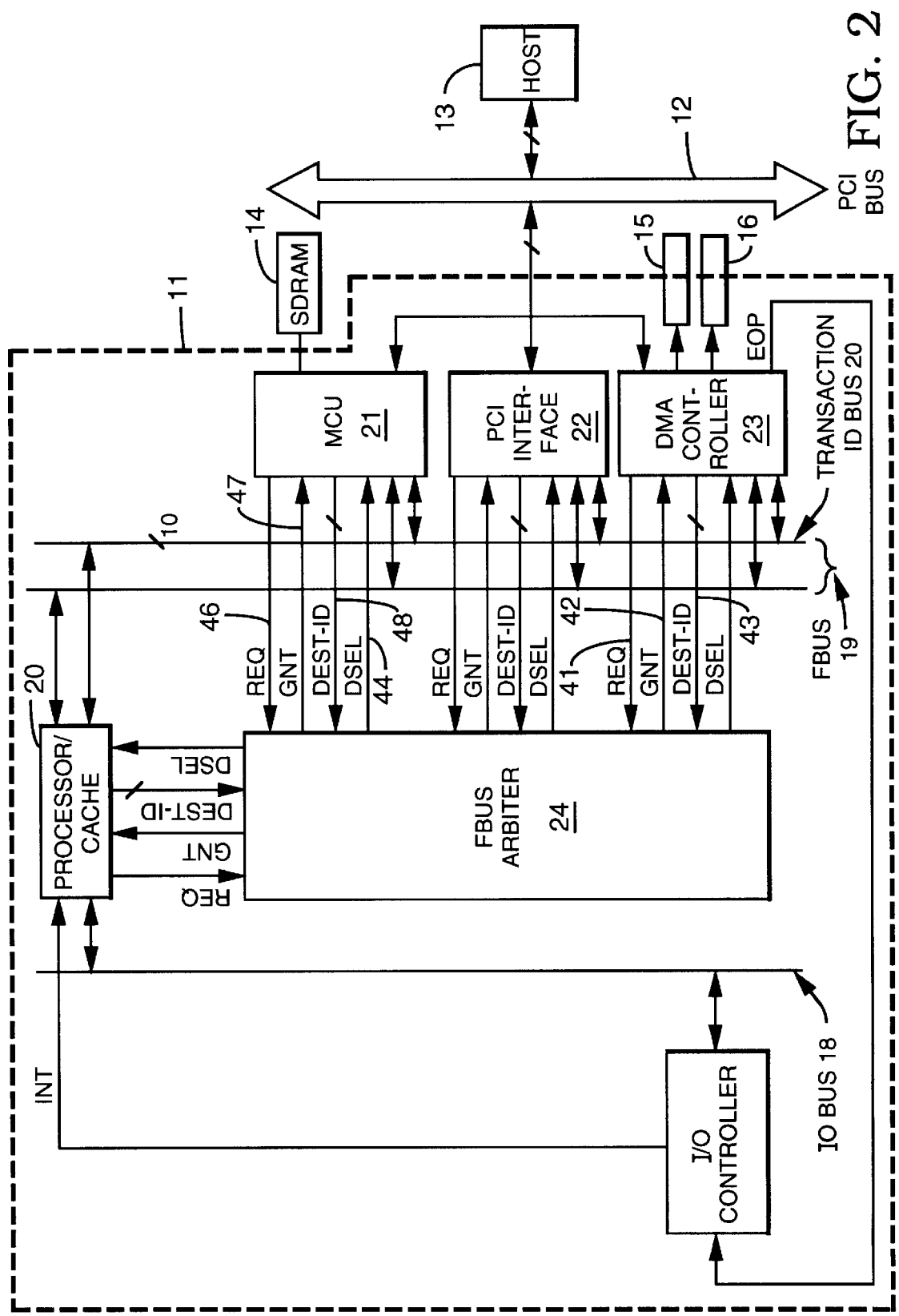
FIG. 2 is a simplified block diagram of a system involving a DMA controller in accordance with the present invention.

FIG. 2 is a simplified block diagram of a system involving a multimedia coprocessor integrated circuit 11, a PCI (Peripheral Component Interconnect) bus 12, a host processor 13, SDRAM (synchronous dynamic random access memory) 14, and two I/O devices 15 and 16. Integrated circuit 11 has two parallel data buses: IO bus 18 and FBUS 19. FBUS 19 is a high speed split transaction bus capable of supporting "posted read" transactions. Transaction ID bus 20 is considered part of the FBUS 19.

There are five devices coupled to the FBUS 19, a processor/cache memory 20 which includes a vector processor, a RISC (reduced instruction set computer) processor and cache memory, a memory control unit 21 for interfacing to SDRAM 14, a PCI interface 22 for interfacing to PCI bus 12, a DMA controller circuit 23 for interfacing to I/O devices 15 and 16, and an FBUS bus arbiter 24. I/O device 15 may, for example, include a video encoder interface, a video encoder, and a video display. I/O device 16 may, for example, include an audio encoder interface, an audio encoder, and a speaker. The video encoder interface and the audio encoder interface are, in the illustrated embodiment, part of integrated circuit 11. For additional details on video and audio interfaces, see the U.S. patent applications entitled "Video Interface And Overlay System And Process" Ser. No. 08/733,905, and "Full Duplex Serial Codec Interface With DMA Access", Ser. No. 08/730,864 by Hoyoung Kim, filed Oct. 18, 1996. For additional details on an FBUS bus arbiter, see the U.S. patent application Ser. No. 08/731,393, entitled "Shared Bus System With Transaction And Destination ID", by Amjad Z. Qureshi, et al., filed Oct. 18,1996, and the U.S. patent application Ser. No. 08/733,411, entitled "DMA Controller Which Receives Size Data For Each DMA Channel", by Amjad Z. Qureshi, et al., filed Oct. 18. 1996. The subject matter of these four applications is incorporated herein by reference.

Figure 3:
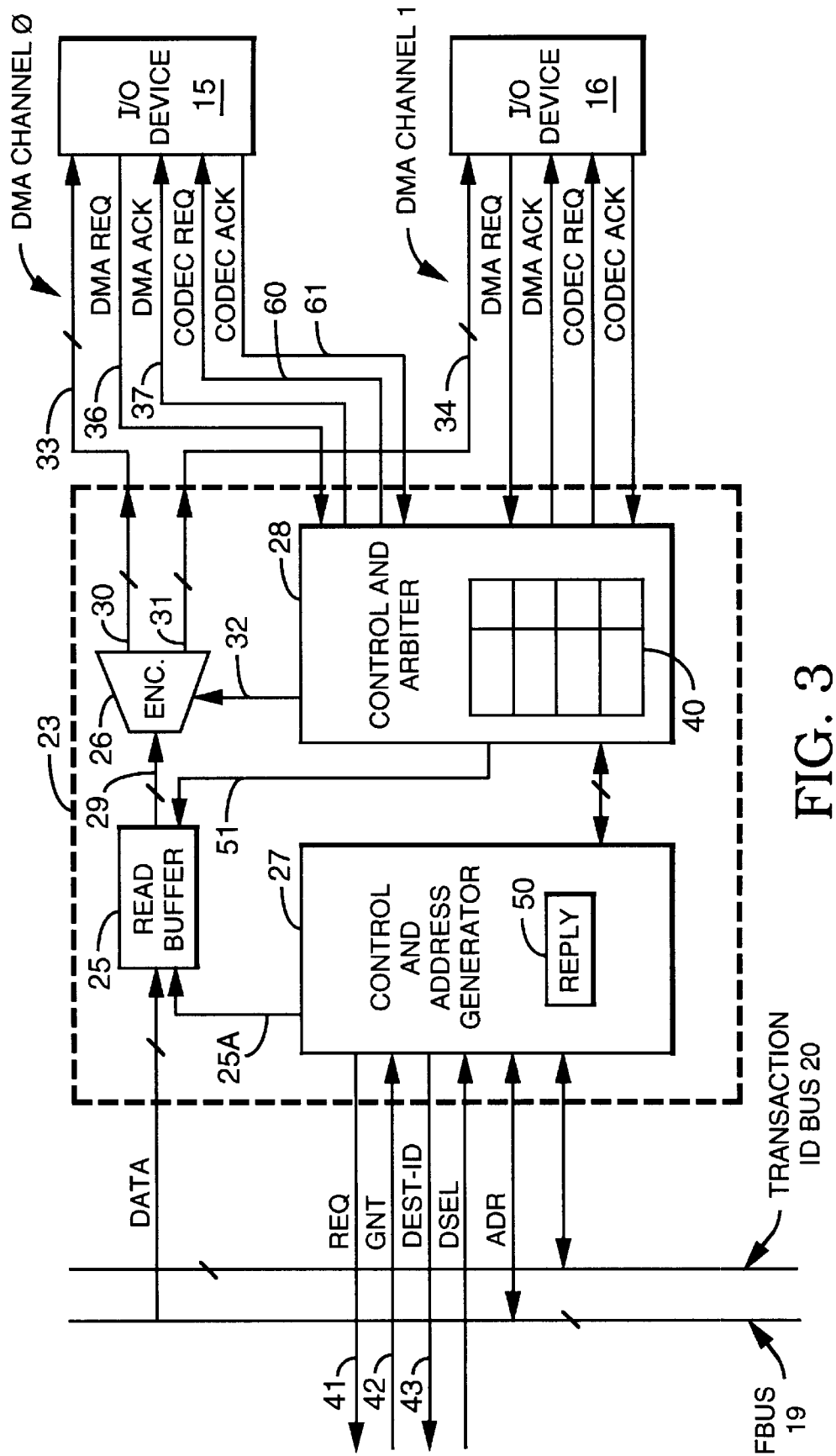
FIG. 3 is a more detailed diagram of the DMA controller circuit of FIG. 2.

FIG. 3 is a more detailed diagram of the DMA controller circuit 23 of FIG. 2. DMA controller circuit 23 includes a read buffer 25, an encoder 26, a control and address generator circuit 27, and a control and arbiter circuit 28. Encoder 26 is a multibit channel encoder in the sense that the encoder 26 couples its plurality of input leads 29 to a selected one of two pluralities of output leads 30 and 31 depending on how its select input lead 32 is controlled. There are two DMA channels: DMA channel 0 through parallel data bus 33 to I/O device 15, and DMA channel 1 through parallel data bus 34 to I/O device 16.

Figure 4:
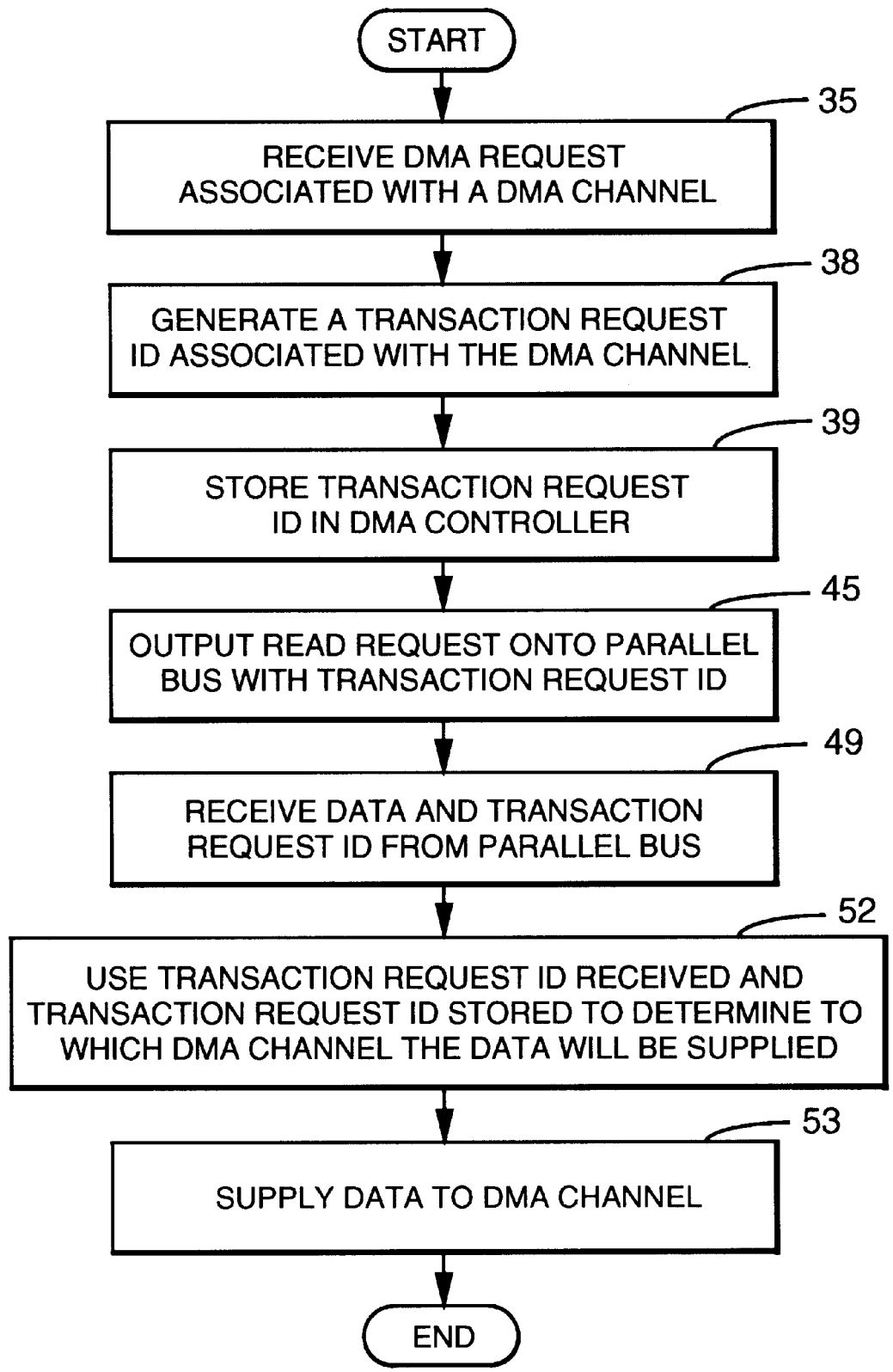
FIG. 4 sets forth a method in accordance with an embodiment of the present invention.

FIG. 4 sets forth a method in accordance with an embodiment of the present invention. If I/O device 15 needs data from SDRAM 14 (see FIG. 2), DMA controller circuit 23 receives a DMA request (step 35) associated with DMA channel 0 via DMA request line 36. DMA controller circuit 23 returns a DMA acknowledge to I/O device 15 via DMA acknowledge line 37 and generates a transaction request ID (step 38) associated with the transaction. In some embodiments, a 6-bit counter of the DMA controller circuit 23 is incremented to generate new 6-bit transaction request IDs. The transaction request ID for the DMA request is stored (step 39) in a memory 40 along with a codec ID. The codec ID indicates which of the DMA channels is associated with the transaction request ID. In this example where there are two DMA channels, a 1-bit codec ID is satisfactory. A codec ID of "0" is therefore stored to indicate DMA channel "0". Had the DMA request been received from I/O device 16, then the codec ID would have been "1" to indicate the request was associated with that DMA channel (DMA channel "1"l).

The DMA controller circuit 23 arbitrates for control of the FBUS 19 by sending the FBUS bus arbiter 24 a bus request signal on its own bus request line 41 (see FIG. 2) and a 2-bit destination ID on its own destination ID lines 43. The 2-bit destination ID indicates the other device on the FBUS 19 from which the DMA controller circuit 23 wishes to receive data. FBUS bus arbiter 24 arbitrates between devices on the FBUS which request control of the FBUS. In this example, assume that DMA controller 23 is the only device requesting control of the FBUS 19. FBUS bus arbiter 24 returns a bus grant signal to DMA controller circuit 23 via the bus grant line 42 of the DMA controller circuit and at the same time selects the destination device by sending a select signal on the device select line DSEL 44 of the destination device. In this example, the destination device is MCU 21. MCU 21 is therefore selected via DSEL line 44.

Once DMA controller circuit 23 is master of the bus, DMA controller circuit 23 issues a read request (step 45) onto FBUS 19 to a desired address and outputs the transaction request ID onto the transaction ID bus 20 so that MCU 21 can latch the transaction request ID from the transaction ID bus 20. The DMA controller circuit 23 then relinquishes the bus. The read request is "posted".

MCU 21 retrieves the data identified by the address on the FBUS 19 from SDRAM 14 and arbitrates for control of the FBUS using its own bus request, bus grant and destination ID lines 46–48. When FBUS bus arbiter 24 gives control of the FBUS to MCU 21, MCU 21 returns the requested data on FBUS as well as the transaction request ID on transaction ID bus 20. The DMA controller circuit 23 therefore receives the data along with the transaction request ID (step 49). In the event that read buffer 25 is a FIFO (first-in-first-out) memory, control and address generator circuit 27 increments a write pointer of buffer 25 via line 25A as necessary to load the data into the read buffer.

Figure 5:
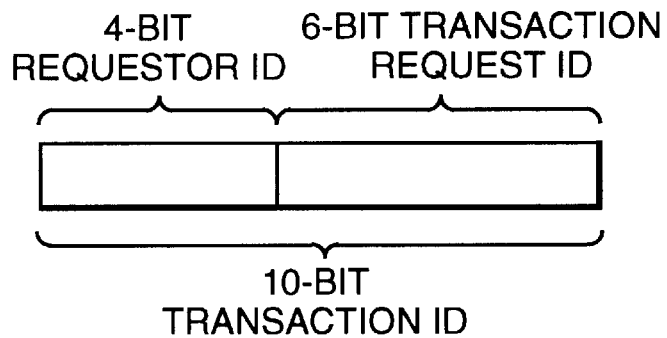
FIG. 5 illustrates a 10-bit transaction ID involving a 6-bit transaction request ID and a 4-bit requester ID.

FIG. 5 illustrates a 10-bit transaction ID on bus 20. The transaction ID includes a 4-bit requester ID and the 6-bit transaction request ID. MCU 21 uses the 4-bit requester ID (identifying the device that posted the read) to determine the value to put on its destination ID lines (to identify the device to which data is to be sent) when it arbitrates for control of the FBUS.

DMA controller circuit 23 then loads the transaction request ID received into a reply register 50. The transaction request ID received is compared with the transaction request IDs stored in memory 40.

After a match is found, the codec ID stored in memory 40 with the matching transaction request ID (step 52) is used to determine the DMA channel that will be supplied with the received data. In the present example, the codec ID is "0" indicating that DMA channel "0" (bus 33) is associated with the transaction. This codec ID is therefore used to control the encoder 26 (see FIG. 3) via select input 35 lead 32 such that the data received from the FBUS 19 is supplied (step 53) to DMA channel "0" (bus 33) and the I/O device 15 that originally issued the DMA request. The control and arbiter circuit 28 issues a codec request signal of I/O device 15 via codec request line 60. When I/O device 15 (in some embodiments, an encoder interface in I/O device block 15) is ready to receive the data, I/O device 15 returns a codec acknowledge signal to control and arbiter circuit 28 via codec acknowledge line 61. The control and arbiter circuit 28 increments a read pointer of the read buffer 25 via line 51 as necessary to read the data out of read buffer 25 and to supply the data to DMA channel 0, bus 33, and I/O device 15. Once the posted read transaction is completed, the used transaction request ID and codec ID are erased from memory 40. FBUS addresses for successive FBUS transaction requests are generated by address generation circuitry (not shown) in the control and address generator circuit 27.

Although the method of FIG. 4 is described in connection with a particular parallel bus (FBUS 19), a particular bus arbitration scheme, a particular DMA controller circuit structure, and a particular I/O device interface, the channel tagging method is not limited thereto. The method is not limited to a particular structure for storing posted transaction request IDs in the DMA controller circuit nor is it limited to the use of a read buffer and an encoder. The DMA controller circuit can support more than two DMA channels. Any suitable arbitration scheme can be used to arbitrate between DMA channels issuing DMA requests. A fixed priority scheme can be used and/or a Round Robin priority scheme can be used. Although the example involves a posted read operation, the channel tagging set forth can be applied to posted write operations. The DMA controller may include a write buffer as well as a read buffer, see the U.S. patent application entitled "Simultaneous Data Transfer Through Read And Write Buffers Of A DMA Controller", Ser. No. 08/773,903, by Kab Ju Moon, et al., filed Oct. 18, 1996, the subject matter of which is incorporated herein by reference.

Figure 6:
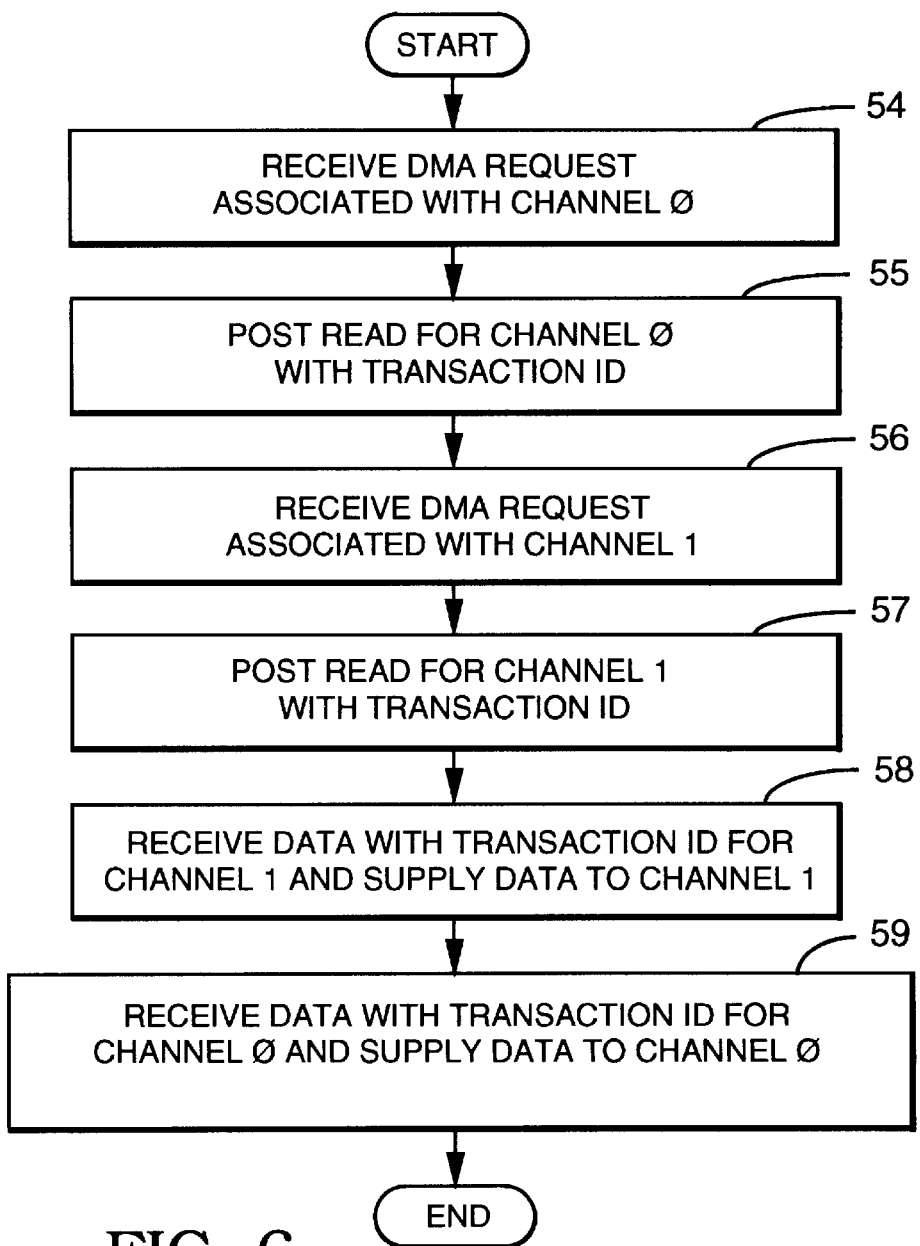
FIG. 6 is a simplified flowchart illustrating operation of a DMA controller circuit wherein DMA requests are serviced in an order other than the order in which they were received.

FIG. 6 is a simplified flowchart illustrating operation of DMA controller circuit 23 wherein DMA requests are serviced in an order other than the order in which they were received. A DMA request is received associated with DMA channel 0 (step 54), the read request is posted with a transaction request ID generated for the DMA request (step 55), a DMA request is received associated with DMA channel 1 (step 56), and the read request is posted with a transaction request ID generated for the second DMA request (step 57). The data for the DMA request for channel 1 is, however, returned from FBUS 19 before the data for the DMA request for channel 0. The transaction request ID received with the data for channel 1 is used to control encoder 26 such that the data is supplied to channel 1 (step 58). When the data for channel 0 is received, the transaction request ID received with the data for channel 0 is used to control encoder 26 such that the data is supplied to channel 0 (step 59). Accordingly, multiple transaction request ID/codec ID pairs for pending operations can be stored in memory 40 at the same time.

In some embodiments, control and arbiter circuit 28 acknowledges DMA requests when the DMA controller 23 cannot service that DMA request until some time later. The FBUS may, for example, not be available. In such embodiments, control and arbiter circuit 28 acknowledges the DMA request and stores information indicative of which DMA channel made the request in a codec FIFO (not shown). Information for multiple such DMA requests can be accumulated in the codec FIFO. At a later time, the stored information for one such DMA request is output from the codec FIFO and is used to generate the FBUS address for the FBUS transaction request. There may, for example, be a separate current address register in the DMA controller for each DMA channel. If the stored information indicates that the DMA request was from a particular DMA channel, then that information is used to determine the particular current address register from which the FBUS address will be taken. For details on a specific embodiment of a DMA controller which supports channel tagging, see the U.S. patent application entitled "DMA Controller Which Receives Size Data For Each DMA Channel", Ser. No. 08/733,411,by Amjad Z. Qureshi, et al., filed Oct. 18, 1996, the subject matter of which is incorporated herein by reference.

Although the present invention is described in connection with certain specific embodiments for instructional purposes, the present invention is not limited thereto. Transaction request ID codec ID pairs need not be stored in a memory in the DMA controller. Other techniques may be employed wherein a returned transaction request ID is used to identify the DMA channel associated with the transaction. Various modifications, adaptations, and combinations of various features of the described embodiments can be practiced without departing from the scope of the invention as set forth in the claims.

What is claimed is:

1. A method, comprising the steps of:
   (a) storing a transaction request ID in a DMA controller, said DMA controller having a first DMA channel and a second DMA channel;
   (b) receiving data and a transaction request ID into said DMA controller from a parallel bus; and
   (c) using said transaction request ID received and said transaction request ID stored to determine which of said first and second DMA channels will be supplied with said data.

2. The method of claim 1, further comprising the steps of:
   receiving a DMA request associated with said first DMA channel into said DMA controller circuit; and
   generating a transaction request ID in said DMA controller circuit associated with said DMA request, said transaction request ID associated with said DMA request being the transaction request ID stored in step (a).

3. The method of claim 2, further comprising the step of:
   before step (b), outputting a read request onto said parallel bus, said read request including the transaction request ID associated with said DMA request.

4. The method of claim 3, wherein step (c) involves comparing said transaction request ID received with said transaction request ID stored and supplying said data to said first DMA channel if said transaction request ID received matches said transaction request ID stored.

5. The method of claim 4, wherein said transaction request ID stored in step (a) is stored along with DMA channel ID bits, said DMA channel ID bits being indicative of which of said first and second DMA channels is to be supplied with said data.

6. The method of claim 5, further comprising the step of:
   storing said data into a buffer in said DMA controller circuit, wherein if said transaction request ID received matches said transaction request ID stored then said DMA channel ID bits stored along with said transaction request ID in step (a) are used to control an encoder coupled to said buffer such that said data stored in said buffer is supplied to said first DMA channel via said encoder.

7. The method of claim 1, wherein said transaction request ID stored in step (a) is stored in a FIFO (first-in-first-out) in said DMA controller circuit.

8. A DMA (direct memory access) controller circuit, comprising:
   means for receiving a DMA request associated with a DMA channel, for generating an associated transaction request ID, and for storing said transaction request ID;
   means for outputting said transaction request ID onto a bus, and for receiving a transaction request ID from said bus in association with data received from said bus; and
   means for supplying said received data to said DMA channel if said transaction request ID stored matches said transaction request ID received.

9. The DMA controller circuit of claim 8, further comprising:
   a buffer for storing said data received from said bus.

10. The DMA controller circuit of claim 8, wherein said means for supplying is an encoder.

11. The DMA controller circuit of claim 8, wherein said means for receiving a DMA request returns a DMA acknowledge signal to said DMA channel in response to receiving said DMA request.

12. The DMA controller circuit of claim 11, wherein said means for receiving a DMA request outputs a request signal to said DMA channel to indicate said data is available to be transferred to said DMA channel, and wherein said means for receiving a DMA request receives an acknowledge signal from said DMA channel.

13. The DMA controller circuit of claim 8, wherein said means for outputting comprises a counter, said counter being incremented to generate successive transaction request IDs such that a first DMA request of two successive DMA requests from said DMA channel has a first transaction request ID and such that a second DMA request of the two successive DMA requests from said DMA channel has a second transaction request ID, the first transaction request ID being different from the second transaction request ID, wherein a processor, a bus arbiter and said DMA controller circuit are coupled to said bus, said bus being a split transaction bus, said first and second transaction request IDs both being stored in said DMA controller circuit and both being transmitted on said split transaction bus.

14. The DMA controller circuit of claim 8, wherein said means for storing said transaction request ID stores information along with said transaction request ID, said information being indicative of the DMA channel associated with the DMA request.

15. The DMA controller circuit of claim 8, wherein said means for storing said transaction request ID stores multiple transaction request IDs, each said transaction request ID being associated with a different DMA request.

16. The DMA controller circuit of claim 8, wherein said means for outputting said transaction request ID is also for generating an address and for outputting that address onto said bus with said transaction request ID.

17. The DMA controller circuit of claim 8, wherein said means for supplying said received data supplies second received data to a second DMA channel if a stored transaction request ID associated with said second DMA channel matches a transaction request ID received from said bus in association with said received data.

18. A DMA (direct memory access) controller circuit, comprising:
   a read buffer having an input coupled to a first bus and an output;
   an encoder having in input coupled to said output of said read buffer, a first output coupled to a second bus, a second output coupled to a third bus, and a select input;

an address generator coupled to said first bus; and a memory storing a plurality of transaction request ID/DMA channel ID pairs, the DMA channel ID of a pair being indicative of whether a DMA request associated with the transaction request ID of the pair was received by the DMA controller circuit in association with the second bus or in association with the third bus, wherein a transaction request ID is received into said DMA controller circuit from said first bus and is compared with all the transaction request IDs stored in said memory, the DMA channel ID of a transaction request ID/DMA channel ID pair whose transaction request ID matches the received transaction request ID being used to control the select input of the encoder.

\* \* \* \* \*